(12) United States Patent
Hass

(10) Patent No.: US 7,082,140 B1
(45) Date of Patent: Jul. 25, 2006

(54) SYSTEM, DEVICE AND METHOD FOR SUPPORTING A LABEL SWITCHED PATH ACROSS A NON-MPLS COMPLIANT SEGMENT

(75) Inventor: Barry L. Hass, Auburndale, MA (US)

(73) Assignee: Nortel Networks Ltd (CA)

(*) Notice: Subject to any disclaimer, the term of this patent is extended or adjusted under 35 U.S.C. 154(b) by 0 days.

(21) Appl. No.: 09/528,261

(22) Filed: Mar. 17, 2000

(51) Int. Cl.
*H04J 3/16* (2006.01)
(52) U.S. Cl. ........................... 370/466; 455/238
(58) Field of Classification Search ............... 370/389, 370/400, 492, 401, 466, 230, 351, 409; 709/227; 455/436
See application file for complete search history.

(56) References Cited

U.S. PATENT DOCUMENTS

| | | | | |
|---|---|---|---|---|
| 6,438,612 | B1* | 8/2002 | Ylonen et al. | 709/249 |
| 6,473,421 | B1* | 10/2002 | Tappan | 370/351 |
| 6,493,349 | B1* | 12/2002 | Casey | 370/409 |
| 6,522,627 | B1* | 2/2003 | Mauger | 370/230 |
| 6,804,776 | B1* | 10/2004 | Lothberg et al. | 713/160 |

OTHER PUBLICATIONS

Le Faucheur, IETF Multiprotocol Label Switching (MPLS) Architeture dated 1998, , pp. 6-15.*
Rosen, IETF , Multiprotocol Label Switching Architecture, Aug. 1999, pp. 1-60.*
Scott, C. and Wolfe, P., "Virtual Private Networks," Jan. 31, 1999, O'Reilly & Associates, California, USA, p. 64, paragraph 4, and p. 70, paragraph 2.
LeFaucheur, F., "IETF Multiprotocol Label Switching (MPLS) Architecture," IEEE International Conference on ATM, Jun. 22, 1998, pp. 6-15.
Davie, et al., "Switching in IP Networks" 1998, Morgan Kaufmann PUblishsers, Calfiornia, USA, p. 55, paragraph 4.

* cited by examiner

*Primary Examiner*—Phirin Sam
*Assistant Examiner*—Robert W. Wilson
(74) *Attorney, Agent, or Firm*—McGuinness & Manarasu

(57) ABSTRACT

A label switched path may traverse multiple network domains of a communication network, namely, a first MPLS domain and a second MPLS domain interconnected by a non-MPLS domain. The label stack information of a packet sent over the LSP is preserved by establishing an tunnel across the non-MPLS domain of the LSP. The tunnel connects the first MPLS domain and the second MPLS domain of the LSP. The packet and label stack information are encapsulated and sent over the tunnel. An MPLS identifier is included in the header of the encapsulated packet so that the packet and label stack information may be identified at the second MPLS domain.

48 Claims, 7 Drawing Sheets

SYSTEM, DEVICE AND METHOD FOR SUPPORTING A LABEL SWITCHED PATH ACROSS A NON-MPLS COMPLIANT SEGMENT

FIELD OF THE INVENTION

The invention generally relates to computer networks and, more particularly, the invention relates to a system and method of supporting a label switched path across a non-MPLS compliant segment of a communication network.

BACKGROUND OF THE INVENTION

Typically, packets of information are routed through a communication network using a networking protocol such as the Internet Protocol (IP), which is a connnectionless networking protocol. In a connectionless networking protocol, each packet of information includes a network layer destination address, and each router forwards a packet of information, based upon the network layer destination address, to the next router on the path. The next router on the path to a particular network layer destination address is predetermined by a routing protocol such as the Open Shortest Path First (OSPF) protocol, the Routing Information Protocol(RIP), or other routing protocol.

Each router makes an independent forwarding decision for the packet based upon its analysis of the network layer destination address in the packet header. Each router determines a next hop for each packet of information based upon the network layer destination address of the packet, and forwards the packet of information to the corresponding next hop (or set of hops) associated with the network layer destination address. Network layer routing, however, requires that each router process each packets' information at the network layer. This operation can be expensive (in terms of computing resources) and time consuming, and can limit the performance of some routers.

Alternatively, packets of information may be routed through a communication network using label switching. Label switching allows a packet to be transported across a network domain using labels rather than the network layer address. A label is a short, fixed length value which represents an forwarding equivalence class ("FEC"). A Label Switched Path (LSP) may be established from an ingress border device to an egress border device in the network domain. The LSP traverses a number of label switching devices. Each label switching device assigns a label to each FEC that it supports. When the packet enters the ingress border device, the ingress border device analyzes the network layer and/or transport layer header of the packet and assigns the packet to a particular FEC. The ingress border device will then insert the corresponding label into the packet, either as a field in the layer 2 header, or as part of a new header inserted between the layer 2 and layer 3 header. Once a packet is assigned a label (and thus an FEC) no further header analysis is done by subsequent label switching devices. Each intermediate label switching device along the LSP makes its forwarding decision for the packet using the label to determine the next hop label and output port for the packet. Each intermediate label switching device will remove the label in the packet and replace it with a label corresponding to the next hop on the label switched path.

It is also possible for a packet to have more than one label (i.e., a label stack). Typically, the label stack is a last-in, first-out stack. When a packet has a label stack, the set of label operations will be the same, i.e., the packet is switched based on the top level of the label stack, except that at some points a label switching device may remove and replace multiple labels or remove the entire label stack. Label stacks allow hierarchical operation or the use of multiple streams within a label switched path.

The Internet Engineering task Force (IETF) Multi-Protocol Label Switching (MPLS) working group has defined an MPLS architecture for utilizing label switching for internetworking. MPLS is considered to be multi-protocol because it can be used with many layer 2 protocols, such as ATM or frame relay, and with any network layer protocol, not just IP. The framework for MPLS is described in an IETF Internet draft document entitled "A Framework for MPLS," which is referenced as draft-ietf-mpls-framework-05.txt (September 1999), and is herein incorporated by reference in its entirety. The MPLS architecture is described in an IETF Internet draft document entitled "Multiprotocol Label Switching Architecture," which is referenced as draft-ietf-mpls-arch-06.txt (August 1999), and is hereby incorporated by reference in its entirety.

In order to use label switching for internetworking, each label switching device must learn the labels that are used by its neighboring label switching device(s). Therefore, the IETF MPLS working group has defined a Label Distribution Protocol (LDP) for distributing labels between neighboring label switching devices. LDP may be used to distribute labels between both contiguous and non-contiguous label switching devices. LDP is described in an IETF Internet Draft document entitled "LDP Specification," which is referenced as draft-ietf-ldp-06.txt (October 1999), and is hereby incorporated by reference in its entirety. There are also other protocols used for label distribution known in the art.

Each label switching device maintains a label information base (LIB) for mapping each FEC to a corresponding label. When the label switching device receives a packet including a label (or label stack), the label switching device utilizes the LIB to map the received label (or the top label of the label stack) to a next hop label and port. The label switching device then replaces the label (or the top label in the label stack) in the packet with the label for the next hop, and forwards the resulting packet to the corresponding outgoing path (or set of paths). In certain situations, when the label switching device is an egress border device, the label switching device will remove the entire label stack.

It may be desirable to set up an LSP which crosses multiple network domains. An LSP which traverses multiple network domains may be desirable for traffic engineering purposes. Traffic engineering is the process of selecting the paths followed by data traffic in a computer network in order to balance the traffic load on the various links, routers, and switches in the network with the goal of reducing congestion and optimizing the use of network resources. MPLS may be used to implement explicitly routed paths to control where the data traffic flows in the network. MPLS traffic engineering routes the traffic flows across a network based on the resources the traffic flow requires and the resources available in the network. Explicitly routed paths may be chosen at or before the time a packet enters the network. In setting up an explicitly routed LSP, it may be desirable to select a route which crosses a non-MPLS domain (i.e., a domain which contains non-MPLS compliant devices).

However, if the network domains traversed by the LSP are not all MPLS domains (i.e. a domain with MPLS compliant devices), any label stack information associated with the packet will be lost when the packet enters the non-MPLS domain (i.e. a domain with non-MPLS compliant devices).

The last MPLS compliant device before the non-MPLS domain (i.e., a border device) will remove the entire label stack from the packet before it is sent to the non-MPLS domain. This is not a problem if the label stack includes only one label because this label would be removed at the egress border device of the MPLS domain in any case. However, if the depth of the label stack is greater than 1, all the information in the label stack will be lost when the egress border device of the MPLS domain removes the label stack.

SUMMARY OF THE INVENTION

In accordance with one aspect of the invention, a method for establishing a label switched path for forwarding a packet and label stack in a communication network which includes a first label switched domain and a second label switched domain interconnected by a non-label switched domain includes establishing a tunnel across the non-label switched domain which connects the first label switched domain and the second label switched domain. The packet and label stack are encapsulated to form a tunnel packet and forwarded through the tunnel. The tunnel may be an IP tunnel such as a Generic Routing Encapsulation (GRE) tunnel. In one embodiment, the first and second label switched domains are Multiprotocol Label Switching (MPLS) domains. In a further embodiment, the method further includes providing an MPLS identifier in the tunnel packet such that the second label switched domain may identify the packet and label stack.

In accordance with another aspect of the invention a device for establishing a label switched path for forwarding a packet and label stack in a communication network which includes a first label switched domain and an second label switched domain interconnected by a non-label switched domain includes label switching forwarding logic for analyzing the label stack of the packet to determine the next hop for the packet. The device further includes encapsulating logic for encapsulating the packet and label stack information to form a tunnel packet and for establishing a tunnel across the non-label switched domain which connects the first label switched domain and the second label switched domain. Forwarding logic forwards the tunnel packet through the tunnel. The tunnel may be an IP tunnel such as a Generic Routing Encapsulation (GRE) tunnel. In one embodiment, the first label switched domain and the second label switched domain are Multiprotocol Label Switching (MPLS) domains. In a further embodiment, the tunnel packet includes a MPLS identifier such that the second label switched domain can identify the packet and label stack.

In yet another embodiment, a method for establishing a label switched path for forwarding a packet and label stack in a communication network which includes a first label switched domain and an second label switched domain interconnected by a non-label switched domain includes establishing a tunnel across the non-label switched domain which connects the first label switched domain and the second label switched domain. A tunnel packet comprised of an encapsulated packet and label stack is received from the tunnel. The encapsulated packet and label stack are decapsulated and then forwarded across the second label switched path.

In a further embodiment, a device for establishing a label switched path for forwarding a packet and label stack in a communication network which includes a first label switched domain and an second label switched domain interconnected by a non-label switched domain includes receiving logic for receiving a tunnel packet from a tunnel across the non-label switched domain which connects the first label switched domain and the second label switched domain, where the tunnel packet is comprised of an encapsulated packet and label stack from the tunnel. The device further includes decapsulating logic for decapsulating the encapsulated packet and label stack. Forwarding logic forwards the decapsulated packet and label stack across the second label switched domain.

In yet another further embodiment, a communication system is provided comprising a first label switched domain having an egress device, a second label switched domain having an ingress device and a non-label switched domain which couples the egress device of the first label switched domain to the ingress device of the second label switched domain. In the communication system a label path for forwarding a packet with a label stack is established by establishing a tunnel from an egress device of the first label switched domain to an ingress device of the second label switched domain over the non-label switched domain, encapsulating the label switched packet by the egress device of the first label switched domain, forwarding the encapsulated label switched packet by the egress device of the first label switched domain over the tunnel to the ingress device of the second label switched domain, decapsulating the encapsulated label switched packet by the ingress device of the second label switched domain; and forwarding the decapsulated label switched packet by the ingress device of the second label switched domain based upon label switching information in the packet.

Further embodiments of the invention are implemented as a computer program product having a computer useable medium with computer readable program code thereon. The computer readable code may be read and utilized by the computer system in accordance with conventional processes.

BRIEF DESCRIPTION OF THE DRAWINGS

The foregoing and other objects and advantages of the invention will be appreciated more fully from the following further description thereof with reference to the accompanying drawings wherein.

DESCRIPTION OF PREFERRED EMBODIMENTS

An embodiment of the invention establishes a tunnel across a non-MPLS domain in a communication network that includes a first MPLS domain and a second MPLS domain interconnected by the non-MPLS domain. An encapsulation technique is used to preserve any label stack information associated with a packet forwarded along a label switched path (LSP) which includes the non-MPLS domain. Specifically, the egress device of the first MPLS domain, instead of removing the label stack, encapsulates the packet and label stack before forwarding the packet and label stack to the first non-MPLS device of the LSP in the non-MPLS domain. A delivery header of the encapsulated packet is used to determine the next hop for the encapsulated packet along the tunnel in the non-MPLS domain. When the encapsulated packet is forwarded to the ingress device of the second MPLS domain, the ingress device decapsulates the packet and label stack. The packet and label stack are then forwarded across the second MPLS domain using label switching.

Figure 1:
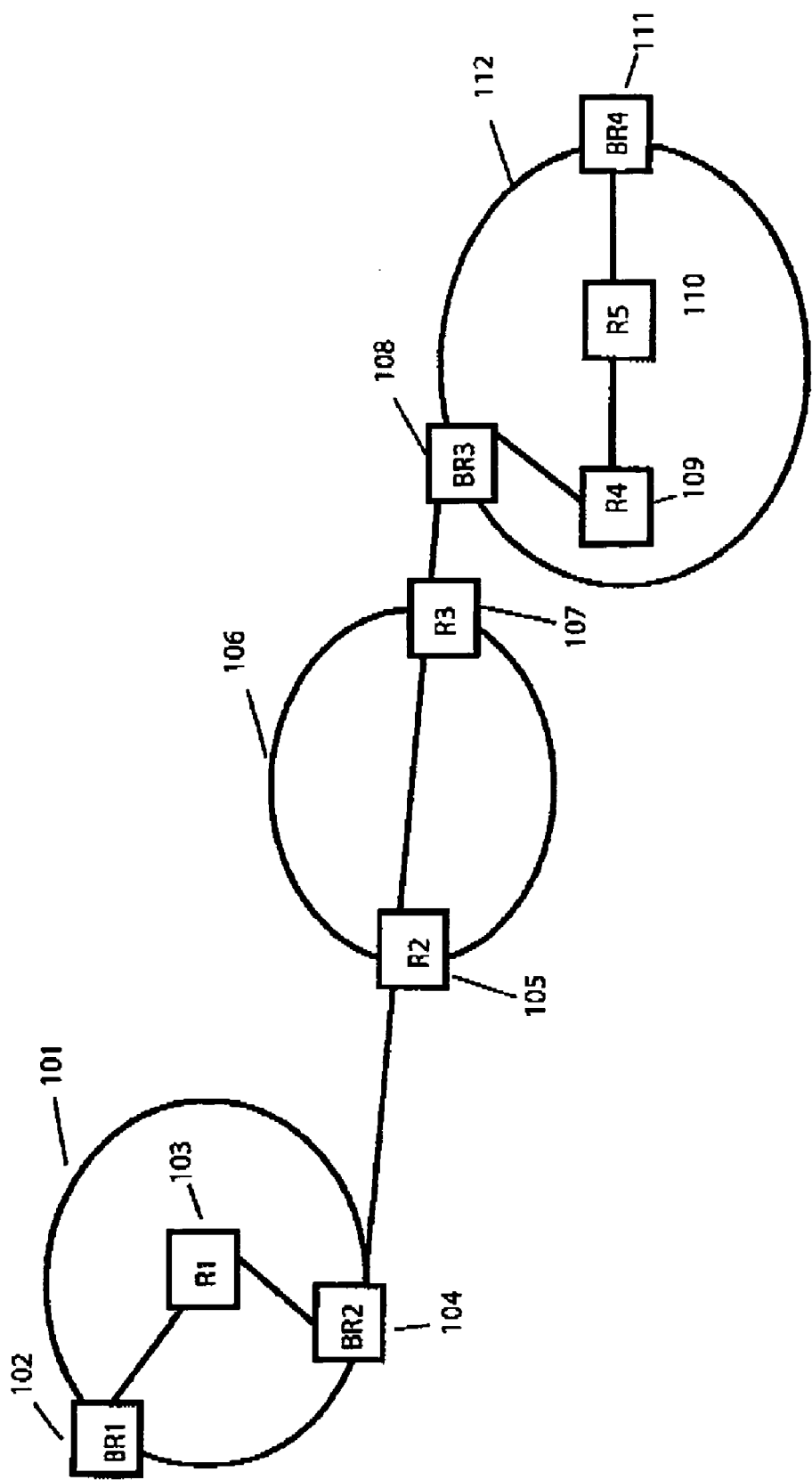
FIG. 1 is a schematic block diagram of a communication network label switched path which includes a non-MPLS domain.

FIG. 1 is a schematic block diagram of an exemplary prior art communication network that includes two MPLS domains (101,112) interconnected by a non-MPLS domain (106). An LSP is established from border router BR1(102) to border router BR4 (111). The LSP shown in FIG. 1 traverses three network domains specifically the first MPLS domain (101), non-MPLS domain (106) and second MPLS domain (112). An LSP such as that shown in FIG. 1 is possible because LDP permits LDP peers (i.e., two label switching devices which use LDP to exchange label/FEC mappings) to be non-contiguous label switching devices. In FIG. 1, border router BR2 (104) and border router BR3 (108) are non-contiguous label switching devices. The first MPLS domain (101) includes border router BR1(102), intermediate router R1 (103) and border router BR2(104). The non-MPLS domain (106) includes router R2(105), router R3(107) and a number of other non-MPLS compliant devices (not shown). The routers in the non-MPLS domain use a network routing protocol such as, for example, IP to forward a packet. The second MPLS domain (112) includes border router BR3 (108), intermediate routers R4(109) and R5(110) and border router BR4(111).

Border router BR1 (102) of the first MPLS domain (101) receives a packet with a label stack to be sent over the LSP to border router BR4(111). Border router BR1(102) processes the packet based upon the top label in the label stack and replaces the top label with a label that corresponds to the next hop FEC of the packet. The packet is then forwarded by border router BR1(102) to intermediate router R1(103). Intermediate router R1(103) receives the packet and processes the packet using the top label of the label stack. Intermediate router R1(103) then replaces the top label of the packet and forwards the packet to border router BR2 (104). Because border router BR2(104) is the edge MPLS device of the first MPLS domain(101), border router BR2 (104) removes the entire label stack from the packet before it is forwarded to router R2(105) in the non-MPLS domain. At this point all of the label stack information is lost. Border router BR2(104) forwards the unlabeled packet (without the label stack) using the network layer destination address of the packet.

In the non-MPLS domain (106), router R2(105) and any intermediate routers (not shown) forward the unlabeled packet based upon the network layer destination address of the packet. Router R3(107) forwards the unlabeled packet to border router BR3(108) of the second MPLS domain(112). Border router BR3(108) analyzes the network layer header (and possibly the transport layer header) of the unlabeled packet to determine the next hop FEC for the packet. Border router BR3(108) inserts a label or labels (i.e. a label stack) into the packet header and forwards the packet to intermediate router R4(109). Forwarding of the packet over the second MPLS domain (112) in the LSP continues using label switching until the packet reaches border router BR4(111).

Figure 2:
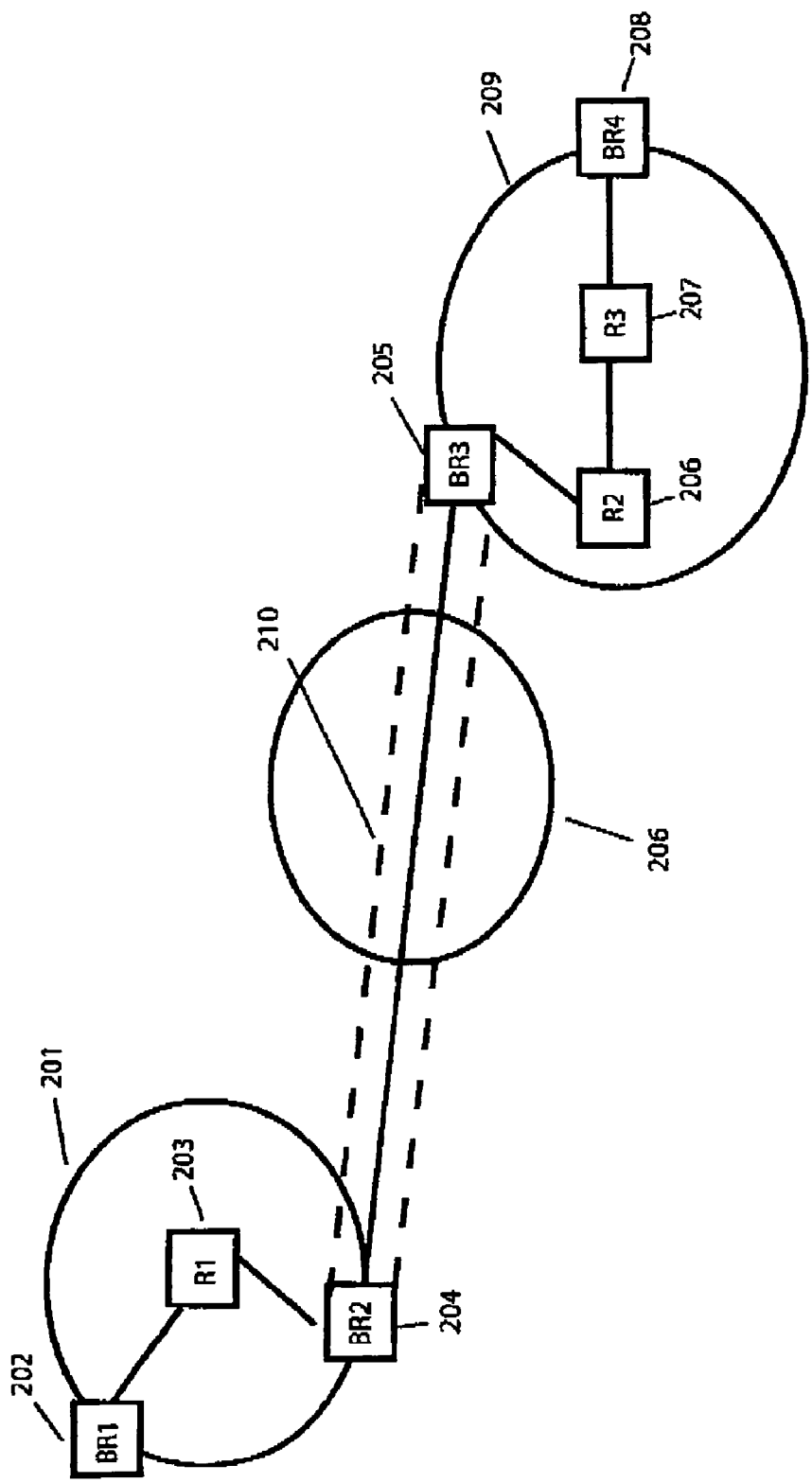
FIG. 2 is a schematic block diagram of a communication network label switched path using an IP tunnel to cross a non-MPLS compliant section of the communication network in accordance with an embodiment of the invention.

As described above, when an LSP crosses a non-MPLS domain, the label stack information associated with the packet delivered over the LSP will be lost when the packet enters the non-MPLS domain. In order to preserve the label stack information of the packet, an IP tunnel may be advantageously established to cross the non-MPLS domain. FIG. 2 is a schematic block diagram of a communication network LSP using an IP tunnel to cross a non-MPLS compliant segment of an LSP in accordance with an embodiment of the invention. An LSP is established between border router BR1(202) and border router BR4(208) which crosses a non-MPLS domain (206). In a prior art embodiment, the label stack information of a packet would be removed by border router BR2(204) before the packet is forwarded to a router along the LSP in the non-MPLS domain (206). However, in an exemplary embodiment of the invention as shown in FIG. 2, an IP tunnel(210) is established across the non-MPLS domain (206) to connect border router BR2 (204) of the first MPLS domain and border router BR3(205) of the second MPLS domain. The IP tunnel may be a generic routing encapsulation (GRE) tunnel. GRE is described in an IETF Request for Comments (RFC) document entitled "Generic Routing Encapsulation (GRE)" [RFC1701 (October 1994)] and an IETF Internet draft document entitled "Generic Routing Encapsulation (GRE)," which is referenced as draft-meyer-gre-update-03.txt (January 2000), and are hereby incorporated by reference in its entirety. The GRE tunnel (210) is used to encapsulate the entire packet including the label stack information. The packet and label stack information may then be sent across the non-MPLS domain through the GRE tunnel (210). In one embodiment, the current implementation of the GRE protocol as described in the above-referenced documents may be modified. Specifically, the GRE protocol would be amended to make MPLS a supported GRE payload packet protocol type. This amendment would require assigning a reference number to the MPLS protocol which a GRE header would carry in its protocol type field.

Returning to FIG. 2, after the GRE tunnel (210) has been established, a GRE header is prepended to the packet and label stack (i.e., the payload packet). The GRE header includes information such as the protocol type of the payload packet. A protocol type identifier corresponding to MPLS is inserted in the GRE header so that border router BR3(205) can identify the packet and process the packet based upon the MPLS label stack.

The GRE packet (i.e., the payload packet and GRE header) is then encapsulated in a delivery header (such as an IP header) and forwarded across the non-MPLS domain. Each router (not shown) in the non-MPLS domain (206) forwards the GRE packet using the IP header. When the GRE packet reaches border router BR3(205) of the second MPLS domain (209), the border router BR3(205) removes the IP and GRE headers and process the payload packet (i.e. the original packet and label stack) using the label stack. Border router BR3(205) places a new label onto the label stack corresponding to the next hop FEC of the packet.

Forwarding of the packet across the second MPLS domain (209) continues using label switching until the packet reaches border router BR4(208). In alternative embodiments of the invention, other IP tunnel types such as Layer Two Tunneling Protocol (L2TP), Layer Two Forwarding (L2F), User Datagram Protocol (UDP) and IP Security (IPSEC) may be used for the IP tunnel (210). Each of these protocol types would require appropriate protocol specific modifications in order to support MPLS as a payload packet protocol type.

Figure 3:
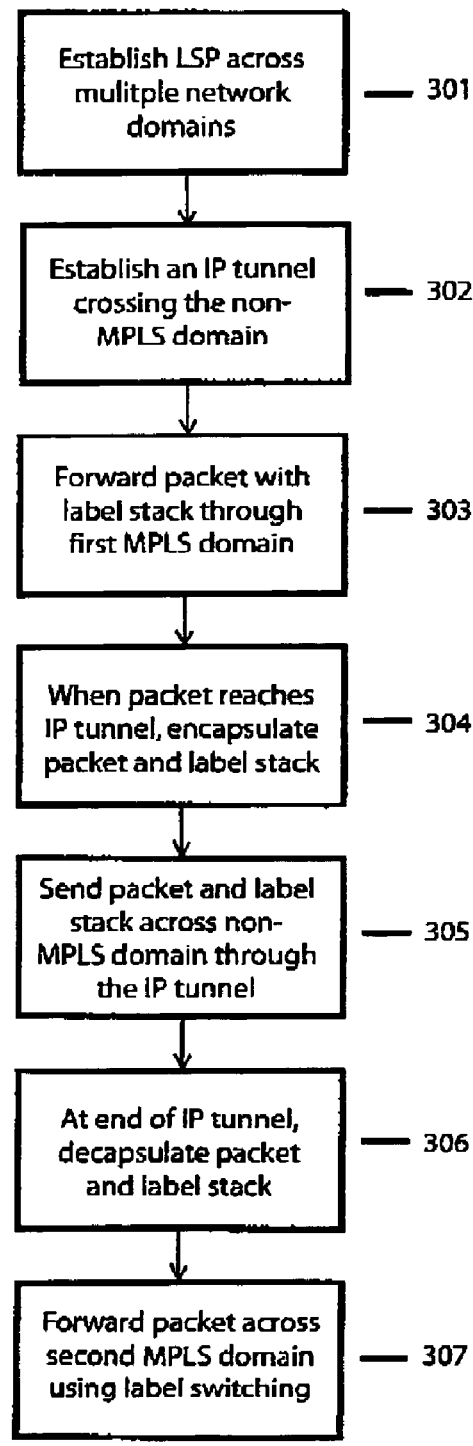
FIG. 3 illustrates the flow of control of a method for supporting a label switched path across a non-MPLS compliant segment in accordance with an embodiment of the invention.

FIG. 3 illustrates the flow of control of a method for supporting a label switched path across a non-MPLS compliant segment in accordance with an embodiment of the invention. At block 301, an LSP is established which traverses multiple network domains, specifically, a first MPLS domain and a second MPLS domain interconnected by a non-MPLS domain. As discussed above, label stack information associated with a packet typically would be removed, in a prior art embodiment, when a packet with a label stack is forwarded from the first MPLS domain to the non-MPLS domain. In order to preserve the label stack information in the packet, at block 302, an IP tunnel is established which crosses the non-MPLS domain and connects the first MPLS domain to the second MPLS domain of the LSP. As discussed above, the IP tunnel may be a GRE tunnel. At block 303, a packet with a label stack is forwarded across the first MPLS domain using label switching until the packet reaches the non-MPLS domain. When the packet reaches the non-MPLS domain, the packet and label stack (the payload packet) are encapsulated at block 304. A GRE and IP header are placed on the payload packet to form a GRE packet. In addition, a payload packet identifier corresponding to MPLS is placed in the GRE header. At block 305, the GRE packet is then sent across the non-MPLS domain through the GRE tunnel. When the GRE packet reaches the second MPLS domain of the LSP, the IP and GRE headers of the GRE packet are removed at block 306 and the payload packet is forwarded across the second MPLS domain using label switching at block 307. By using the IP tunnel, the label stack information of the packet is preserved as it crosses the non-MPLS domain of the LSP. In alternative embodiments of the invention, the IP tunnel may be a L2TP, L2F, UDP or IPSEC tunnel.

Figure 4:
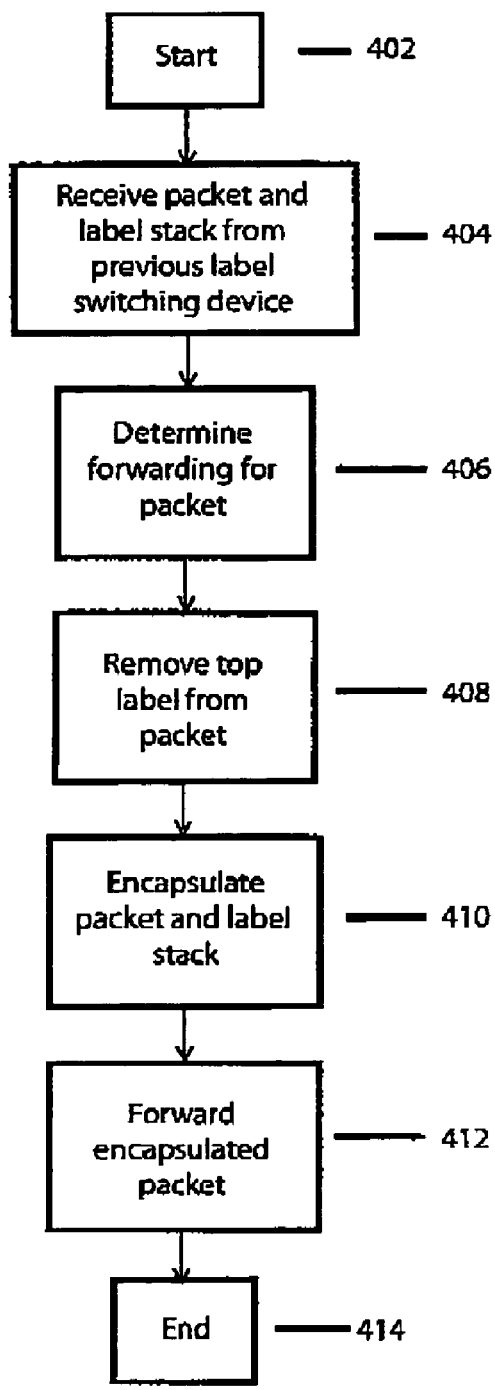
FIG. 4 illustrates the flow of control of an egress device in a first label switched domain along the label switched path in accordance with the embodiment of FIG. 2.

FIG. 4 illustrates the flow of control of an egress device in the first label switched domain along the label switched path (LSP) in accordance with the embodiment of FIG. 2. Starting at block 402, the egress device (such as border router BR2 as shown in FIG. 2) receives a packet with a label stack from the previous label switching device in the LSP at block 404. The egress device then analyzes the top label of the packet to determine the forwarding for the packet in block 406. If the LSP traverses the non-MPLS domain, then the next hop for the LSP is mapped to an ingress border device of the non-MPLS domain. The mapping also indicates that the packet should be encapsulated before being forwarded to the non-MPLS domain. In other words, the packet label will infer a mapping of the label to the tunnel across the non-MPLS domain.

Once the egress device has determined the forwarding for the packet, in this case to the tunnel across the non-MPLS domain, the egress device removes (or pops) the top label from the label stack of the packet at block 408. At block 410, the packet and label stack are encapsulated. As described above, in one embodiment, the packet and label stack are encapsulated using GRE. Once the packet and label stack are encapsulated, the encapsulated packet is forwarded to the next hop device in the non-MPLS domain using the encapsulation header at block 412. The logic terminates at block 414.

Figure 5:
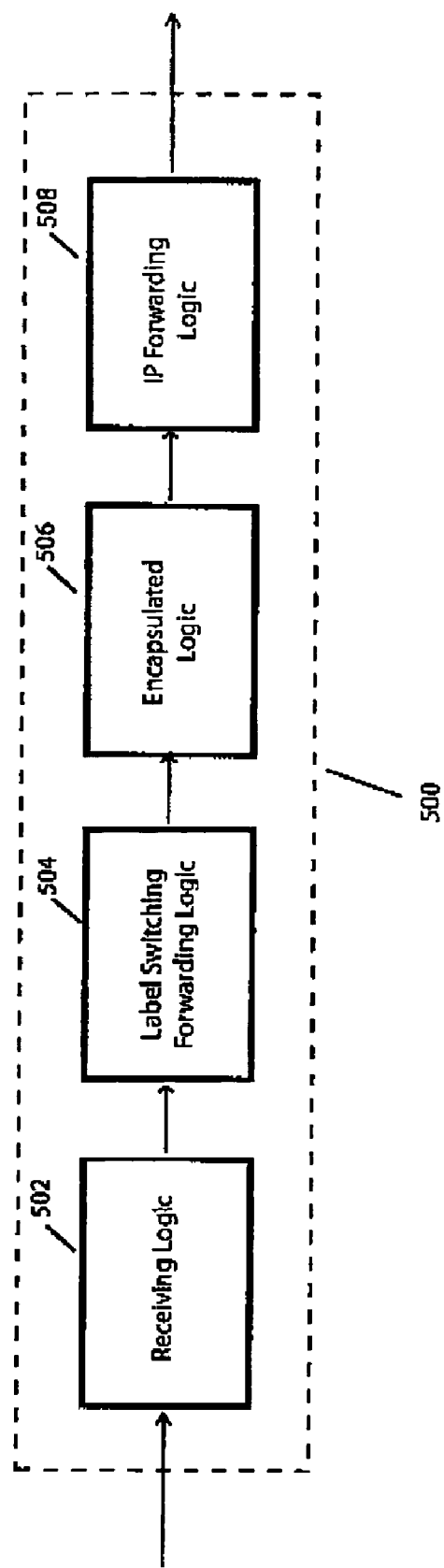
FIG. 5 is a block diagram of an egress device in the first label switched domain along the label switched path in accordance with the embodiment of FIG. 2.

FIG. 5 is a block diagram of an egress device 500 in the first label switched domain along the label switched path in accordance with the embodiment of FIG. 2. The egress device 500 includes receiving logic 502 for receiving a packet with a label stack from the previous label switching device in the label switched path. Label switching forwarding logic 504 is used to analyze the top label of the label stack to determine the next hop for the packet. The label switching forwarding logic 504 identifies that the next hop is in the non-MPLS domain and that the packet and label stack should be encapsulated before being forwarded. Encapsulation logic 506 is then used to encapsulate the packet and label stack for delivery along a tunnel across the non-MPLS domain. IP forwarding logic 508 forwards the encapsulated packet to the next hop device in the non-MPLS domain.

Figure 6:
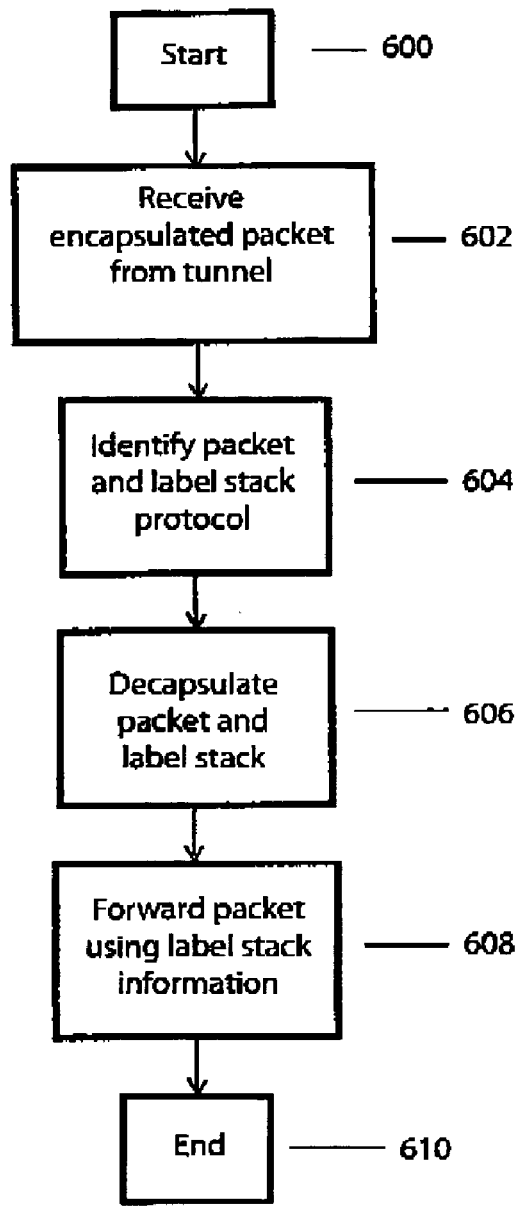
FIG. 6 illustrates the flow of control of an ingress device in a second label switched domain along the label switched path in accordance with the embodiment of the FIG. 2.

FIG. 6 illustrates the flow of control for an ingress device of the second label switched domain along the label switched path in accordance with the embodiment of FIG. 2. Starting at block 600, the ingress devices receives an encapsulated packet from the last non-MPLS device of the tunnel across the non-MPLS domain at block 602. The packet is analyzed to identify the payload packet protocol as MPLS using an identifier in the header of the encapsulated packet at block 604. At block 606, the encapsulation headers are removed from the encapsulated packet leaving only the original packet and label stack. At block 608, the ingress device forwards the packet and label stack based on the top label of the label stack. The ingress device will place a label on the label stack corresponding to the next hop for the packet. The packet and label stack are forwarded to the next hop label switching device along the LSP in the second MPLS domain. The logic terminates at block 610.

Figure 7:
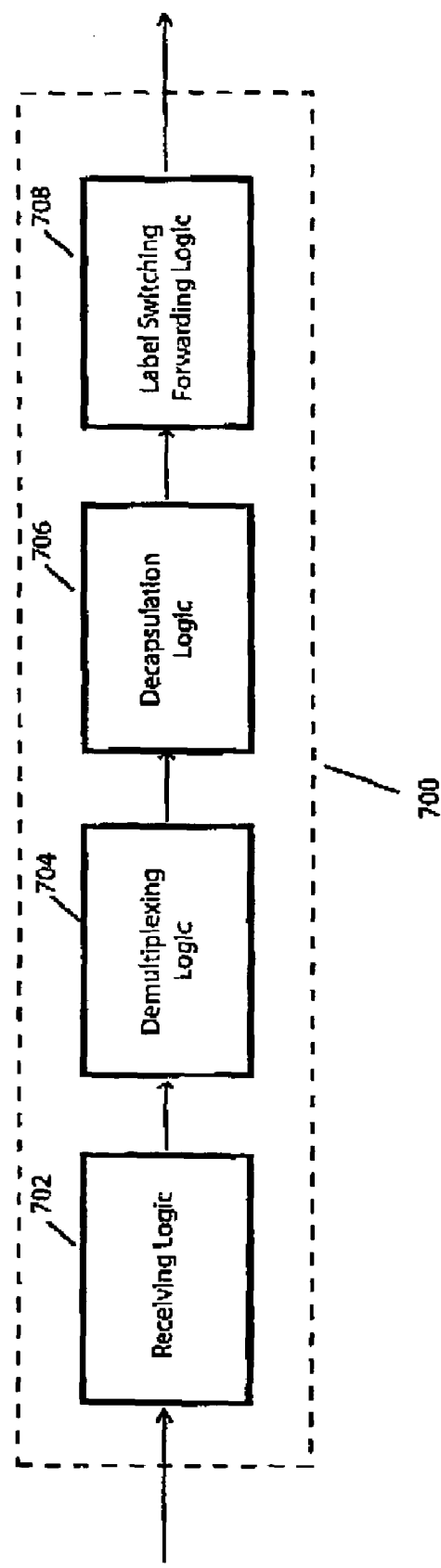
FIG. 7 is a block diagram of an ingress device in a second label switched domain along the label switched path in accordance with the embodiment of the FIG. 2.

FIG. 7 is a block diagram of an ingress device 700 in a second MPLS domain along the label switched path in accordance with the embodiment of FIG. 2. The ingress device 700 includes receiving logic 702 for receiving an encapsulated packet from the last non-MPLS device of the tunnel across the non-MPLS domain. Demultiplexing logic 704 identifies the payload packet protocol as MPLS using an identifier in the header of the encapsulated packet. Decapsulation logic 706 removes the encapsulation headers from the encapsulated packet leaving the original packet and label stack. Label switching forwarding logic 708 then forwards the packet to the next hop label switching device of the LSP in the second MPLS domain based on the top label of the packet.

In a preferred embodiment of the invention, predominantly all of the logic for supporting a label switched path across a non-MPLS compliant segment is implemented as a set of computer program instructions that are stored in a computer readable medium and executed by an embedded microprocessor system within the router. Preferred embodiments of the invention may be implemented in any conventional computer programming language. For example, preferred embodiments may be implemented in a procedural programming language (e.g., "C") or an object oriented programming language (e.g., "C++"). Alternative embodiments of the invention may be implemented using discrete components, integrated circuitry, programmable logic used in conjunction with a programmable logic device such as a Field Programmable Gate Array (FPGA) or microprocessor, or any other means including any combination thereof.

Alternative embodiments of the invention may be implemented as a computer program product for use with a computer system. Such implementation may include a series of computer instructions fixed either on a tangible medium, such as a computer readable media (e.g., a diskette, CD-ROM, ROM, or fixed disk), or fixed in a computer data signal embodied in a carrier wave that is transmittable to a computer system via a modem or other interface device, such as a communications adapter connected to a network over a medium. The medium may be either a tangible medium (e.g., optical or analog communications lines) or a medium implemented with wireless techniques (e.g., microwave, infrared or other transmission techniques). The series of computer instructions preferably embodies all or part of the functionality previously described herein with respect to the system. Those skilled in the art should appreciate that such computer instructions can be written in a number of programming languages for use with many computer architectures or operating systems. Furthermore, such instructions may be stored in any memory device, such as semiconductor, magnetic, optical or other memory devices, and may be transmitted using any communications technology, such as optical, infrared, microwave, or other transmission technologies. It is expected that such a computer program product may be distributed as a removable medium with accompanying printed or electronic documentation (e.g., shrink wrapped software), preloaded with a computer system (e.g., on system ROM or fixed disk), or distributed from a server or electronic bulletin board over the network (e.g., the Internet or World Wide Web).

It should be noted that the term "packet" is used herein generically to describe various protocol messages that are processed by a communication device, and should not be construed to limit application of the present invention to a specific protocol message format or communication protocol. Thus, a "packet" may be any protocol message including, but not limited to, a frame, a packet, a datagram, a user datagram or a cell.

It should also be noted that the terms "router" and "switch" are used herein generically to describe any of a variety of devices that implement the described protocols and procedures for supporting a LSP across a non-MPLS segment, and should not be construed to limit application of the present invention to any specific type of device.

It should be noted that, although the present invention utilizes IETF Label Distribution Protocol ("LDP") for distributing labels between various label switching devices, the mechanism described herein can be applied more generally to other protocols, including, but not limited to, various embodiments of the IETF LDP as currently defined or hereinafter revised. The present invention is in no way limited to the IETF LDP.

It should also be noted that, although the present invention utilizes IETF Multi-Protocol Label Switching ("MPLS") for utilizing label switching for internetworking, the mechanism described herein can be applied more generally to other label switching protocols, including, but not limited to, various embodiments of the IETF MPLS as currently defined or hereinafter revised. The present invention is in no way limited to the IETF MPLS.

It should be noted that, although a preferred embodiment of the invention uses Generic Routing Encapsulation ("GRE") protocol for tunneling, the mechanism described herein can be applied more generally to other tunneling protocols. The present invention is in no way limited to GRE.

Thus, the present invention may be embodied as a method for establishing a label switched path for forwarding a packet with a label stack in a communication network which includes a first label switched domain and a second label switched domain interconnected by a non-label switched domain. The method involves establishing a tunnel across the non-label switched domain which connects the first label switched domain and the second label switched domain, encapsulating the packet and label stack to form a tunnel packet and forwarding the tunnel packet through the tunnel.

The present invention may be embodied as a device for establishing a label switched path for forwarding a packet with a label stack in a communication network which includes a first label switched domain and a second label switched domain interconnected by a non-label switched domain. The device includes label switching forwarding logic for analyzing the label stack of the packet to determine the next hop for the packet, encapsulating logic for encapsulating the packet and label stack to form a tunnel packet and for establishing a tunnel across the non-label switched domain which connects the first label switched domain and the second label switched domain, and forwarding logic for forwarding the tunnel packet through the tunnel.

The present invention may also be embodied as a computer program product comprising a computer readable medium having embodied therein a computer program for establishing a label switched path for forwarding a packet with a label stack in a communication network which includes a first label switched domain and a second label switched domain interconnected by a non-label switched domain. The computer program includes program code establishing a tunnel across the non-label switched domain which connects the first label switched domain and the second label switched domain, program code for encapsulating the packet and label stack to form a tunnel packet and program code for forwarding the tunnel packet through the tunnel.

The present invention may be embodied as a communication system including a first label switched domain having an egress device, a second label switched domain having an ingress device and a non-label switched domain which couples the egress device of the first label switched domain to the ingress device of the second label switched domain where a label switched path for forwarding a packet with a label stack is established by establishing a tunnel from an egress device of the first label switched domain to an ingress device of the second label switched domain over the non-label switched domain, encapsulating the label switched packet by the egress device of the first label switched domain, forwarding the encapsulated label switched packet by the egress device of the first label switched domain over the tunnel to the ingress device of the second label switched domain, decapsulating the encapsulated label switched packet by the ingress device of the second label switched domain and forwarding the decapsulated label switched packet by the ingress device of the second label switched domain based upon label switching information in the packet.

Although various exemplary embodiments of the invention have been disclosed, it should be apparent to those skilled in the art that various changes and modifications can be made which will achieve some of the advantages of the invention without departing from the true scope of the invention. These and other obvious modifications are intended to be covered by the appended claims.

The invention claimed is:

1. A method for establishing a multi-protocol label switched ("MPLS") path for forwarding a packet formatted in accordance with MPLS, including a label stack, through a communication network including a first label switched domain and a second label switched domain interconnected by a non-label switched domain, the method comprising:
   establishing a tunnel across the non-label switched domain which connects the first label switched domain and the second label switched domain;
   encapsulating the packet and label stack by appending a non-MPLS protocol header to the packet and label stack, thereby forming an encapsulated packet;
   setting an identifier in the non-MPLS protocol header to indicate that the label stack is in the encapsulated packet;
   forwarding the encapsulated packet through the tunnel;
   receiving the encapsulated packet at the second label switched domain; and
   de-encapsulating the encapsulated packet by removing the non-MPLS protocol header, whereby label stack information is preserved.

2. A method according to claim 1, wherein establishing a tunnel includes mapping a top label of the label stack to the tunnel.

3. A method according to claim 1, wherein the tunnel is an IP tunnel.

4. A method according to claim 3, wherein the IP tunnel is a Generic Routing Encapsulation (GRE) tunnel.

5. A method according to claim 1, wherein the first label switched domain is a Multiprotocol Label Switching (MPLS) domain.

6. A method according to claim 1, wherein the second label switched domain is a Multiprotocol Label Switching (MPLS) domain.

7. A method according to claim 1, wherein the first label switched domain is a MPLS domain and the second label switched domain is a MPLS domain.

8. A method according to claim 7, wherein encapsulating the packet and label stack information includes providing an MPLS identifier in the encapsulated packet such that the second label switched domain may identify the packet and label stack.

9. A device for establishing a multi-protocol label switched ("MPLS") path for forwarding a packet with a label stack in a communication network, the communication network including a first label switched domain and a second label switched domain interconnected by a non-label switched domain, the device comprising:
   label switching forwarding logic for identifying the next hop for the packet;
   encapsulating logic for encapsulating the packet and label stack information by appending a non-MPLS protocol header to the packet and label stack, to form an encapsulated packet and for establishing a tunnel across the non-label switched domain which connects the first label switched domain and the second label switched domain, including logic operable to set a label switching protocol identifier in the non-MPLS protocol header such that the second label switched domain can identify the packet and label stack; and
   forwarding logic for forwarding the encapsulated packet through the tunnel.

10. A device according to claim 9, wherein the label switching forwarding logic includes mapping logic for mapping a top label of the label stack to the tunnel.

11. A device according to claim 9, wherein the tunnel is an IP tunnel.

12. A device according to claim 11, wherein the IP tunnel is a Generic Routing Encapsulation (GRE) tunnel.

13. A device according to claim 9, wherein the first label switched domain is a Multiprotocol Label Switching (MPLS) domain.

14. A device according to claim 9, wherein the second label switched domain is a Multiprotocol Label Switching (MPLS) domain.

15. A device according to claim 9, wherein the first label switched domain is a MPLS domain and the second label switched domain is a MPLS domain.

16. A device according to claim 15, wherein the encapsulated packet includes an MPLS identifier such that the second label switched domain may identify the packet and label stack.

17. A computer program product for generating a packet for use on a computer system for establishing a multi-protocol label switched ("MPLS") path for forwarding a packet with a label stack in a communication network, the communication network including a first label switched domain and a second label switched domain interconnected by a non-label switched domain, the computer program product comprising a computer usable medium having computer readable program code thereon, the computer readable program code including:
   program code for establishing an IP tunnel across the non-label switched domain which connects the first label switched domain and the second label switched domain;
   program code for encapsulating the packet and label stack information to form an encapsulated packet by appending a non-MPLS protocol header to the packet and label stack, and setting a label switching protocol identifier in the non-MPLS protocol header such that the second label switched domain can identify the packet and label stack; and
   program code for forwarding the encapsulated packet through the tunnel.

18. A computer program product according to claim 17, further including program code for mapping a top label of the label stack to the tunnel.

19. A computer program according to claim 17, wherein the tunnel is an IP tunnel.

20. A computer program product according to claim 19, wherein the IP tunnel is a Generic Routing Encapsulation (GRE) tunnel.

21. A computer program product according to claim 17, wherein the first label switched domain is a Multiprotocol Label Switching (MPLS) domain.

22. A computer program product according to claim 17, wherein the second label switched domain is a Multiprotocol Label Switching (MPLS) domain.

23. A computer program product according to claim 17, wherein the first label switched domain is a MPLS domain and the second label switched domain is a MPLS domain.

24. A computer program product according to claim 23, further including program code for providing an MPLS identifier in the encapsulated packet such that the second label switched domain may identify the packet and label stack.

25. A method for establishing a multi-protocol label switched ("MPLS") path for forwarding a packet with a label stack in a communication network, the communication network including a first label switched domain and a second label switched domain interconnected by a non-label switched domain, the method comprising:
- establishing a tunnel across the non-label switched domain which connects the first label switched domain and the second label switched domain;
- receiving an encapsulated non-MPLS protocol packet having a non-MPLS header from the tunnel, the encapsulated packet including a label stack;
- recognizing a label switching protocol identifier in the non-MPLS header;
- in response to recognizing the label switching protocol identifier, de-encapsulating the encapsulated packet and label stack; and
- forwarding the de-encapsulated packet and label stack across the second label switched domain.

26. A method according to claim 25, wherein the first label switched domain is a MPLS domain and the second label switched domain is a MPLS domain.

27. A method according to claim 25, wherein the tunnel is an IP tunnel.

28. A method according to claim 27, wherein the IP tunnel is a Generic Routing Encapsulation (GRE) tunnel.

29. A device for establishing a multi-protocol label switched ("MPLS") path for forwarding a packet with a label stack in a communication network, the communication network including a first label switched domain and a second label switched domain interconnected by a non-label switched domain, the device comprising:
- receiving logic for receiving an encapsulated packet from a tunnel across the non-label switched domain which connects the first label switched domain and the second label switched domain, the encapsulated packet having a non-MPLS header and including a label stack in a payload portion;
- recognizing a label switching protocol identifier in the non-MPLS header;
- in response to recognizing the label switching protocol identifier, de-encapsulating logic for de-encapsulating the encapsulated packet and label stack; and
- forwarding logic for forwarding the de-encapsulated packet and label stack across the second label switched domain.

30. A device according to claim 29, wherein the tunnel is an IP tunnel.

31. A device according the claim 30, wherein the IP tunnel is a Generic Routing Encapsulation (GRE) tunnel.

32. A device according to claim 29, wherein the first label switched domain is an MPLS domain and the second label switched domain is a MPLS domain.

33. A computer program product for use on a computer system for establishing a multi-protocol label switched ("MPLS") path for forwarding a packet with a label stack in a communication network, the communication network including a first label switched domain and a second label switched domain interconnected by a non-label switched domain, the computer program product comprising a computer useable medium having computer readable program code thereon, the computer readable program code including:
- program code for establishing a tunnel across the non-label switched domain which connects the first label switched domain and the second label switched domain;
- program code for receiving an encapsulated packet from the tunnel, the encapsulated packet having a non-MPLS header and including a label stack in a payload portion;
- program code for recognizing a label switching protocol identifier in the non-MPLS header;
- program code operable in response to recognizing the label switching protocol identifier to de-encapsulate the encapsulated packet and the label stack; and
- program code for forwarding the de-encapsulated packet and label stack across the second label switched domain.

34. A computer program product according to claim 33, wherein the tunnel is an IP tunnel.

35. A computer program product according to claim 34, wherein the IP tunnel is a Generic Routing Encapsulation (GRE) tunnel.

36. A computer program product according to claim 33, wherein the first label switched domain is a MPLS domain and the second label switched domain is a MPLS domain.

37. A method, executed in a communication system having a first label switched domain interconnected with a second label switched domain by a non-label switched domain, for forwarding a label switched packet from the first label switched domain to the second label switched domain, the method comprising:
- establishing a tunnel from an egress device of the first label switched domain to an ingress device of the second label switched domain over the non-label switched domain;
- encapsulating the label switched packet by the egress device of the first label switched domain by appending a non-label switching protocol header to the label switched picket;
- setting an identifier in the non-label switching protocol header, the identifier being indicative that the label switched packet is encapsulated by the non-label switching protocol header;
- forwarding the encapsulated label switched packet by the egress device of the first label switched domain over the tunnel to the ingress device of the second label switched domain;
- in response to recognition of the identifier, de-encapsulating the encapsulated label switched packet by the ingress device of the second label switched domain; and
- forwarding the de-encapsulated label switched packet by the ingress device of the second label switched domain based upon label switching information in the packet.

38. A communication system according to claim 37, wherein the first label switched domain is a MPLS domain and the second label switched domain is a MPLS domain.

39. A communication system according to claim 37, wherein the tunnel is an IP tunnel.

40. A communication system according to claim 39, wherein the IP tunnel is a Generic Routing Encapsulation (GRE) tunnel.

41. A computer program stored on a computer readable medium for executing a tunneling protocol for interconnecting a first label switched domain and a second label switched domain, comprising:
- encapsulation means for encapsulating a payload packet from a label switched protocol having a label stack by appending a non-label switching header to the payload packet and setting a protocol type indicator in the header for identifying the label switched protocol of the payload packet.

42. A computer program stored on a computer readable medium according to claim 41, wherein the label switched protocol is MPLS.

43. A computer program stored on a computer readable medium according to claim 41, wherein the tunneling protocol is a modified Generic routing Encapsulation (GRE) protocol.

44. A communication system comprising a first label switched domain having an egress device, a second label switched domain having an ingress device and a non-label switched domain which couples the egress device of the first label switched domain to the ingress device of the second label switched domain, wherein a label switched path for forwarding a packet and a label stack is established by
- establishing a tunnel from an egress device of the first label switched domain to an ingress device of the second label switched domain over the non-label switched domain;
- encapsulating the packet and label stack by the egress device of the first label switched domain by appending a non-label switched header;
- setting an identifier in the non-label switched header, the identifier being indicative of the presence of the label stack in the encapsulated packet;
- forwarding the encapsulated packet and label stack by the egress device of the first label switched domain over the tunnel to the ingress device of the second label switched domain;
- in response to recognition of the identifier, de-encapsulating the encapsulated packet and label stack by the ingress device of the second label switched domain; and
- forwarding the de-encapsulated packet and label stack by the ingress device of the second label switched domain based upon label switching information in the packet.

45. A communication system according to claim 44, the first label switched domain is a MPLS domain and the second label switched domain is a MPLS domain.

46. A communication system according to claim 44, wherein the tunnel is an IP tunnel.

47. A communication system according to claim 46, wherein the IP tunnel is a Generic Routing Encapsulation (GRE) tunnel.

48. A communication system comprising:
- a first label switched domain for forwarding a label switched packet, the first label switched domain having a plurality of label switching devices including an egress device;
- a second label switched domain for forwarding the label switched packet, the second label switched domain having a plurality of label switching devices including an ingress device; and
- a non-label switched domain having a plurality of forwarding devices, the non-label switched domain coupled the egress device of the first label switched domain to the ingress device of the second label switched domain; wherein:
- the egress device establishes a tunnel from the first label switched domain to the ingress device of the second label switched domain across the non-label switched domain;
- the egress device encapsulates the label switched packet by appending a non-label switched header and setting an identifier in the header indicative of the presence of the label switched packet;
- the egress device forwards the encapsulated label switched packet over the tunnel to the ingress device of the second label switched domain;
- the ingress device receives the encapsulated label switched packet from the tunnel;
- in response to recognition of the identifier, the ingress device de-encapsulates the encapsulated label switched packet; and
- the ingress device forwards the de-encapsulated label switched packet based on label switching information in the packet.

* * * * *